United States Patent

[11] 3,571,688

| [72] | Inventors | Walter Tomasulo, Jr.<br>Wayne;<br>George R. Brown, Emerson, N.J. |
|---|---|---|
| [21] | Appl. No. | 770,347 |
| [22] | Filed | Oct. 24, 1968 |
| [45] | Patented | Mar. 23, 1971 |
| [73] | Assignee | Hoke Incorporated<br>Cresskill, N.J. |

[54] PHASE DISCRIMINATING CONTROL APPARATUS FOR A BIDIRECTIONAL SOLID-STATE AC POSITION SERVOMOTOR CONTROL
1 Claim, 1 Drawing Fig.

[52] U.S. Cl. .................................................. 318/683,
318/681, 318/674, 307/262, 307/232, 329/103
[51] Int. Cl. ....................................................... G05b 11/12
[50] Field of Search ........................................... 307/262,
232, 236; 329/103, 110; 318/20.835, 20.845,
20.810, 6

[56] References Cited
UNITED STATES PATENTS

| 2,901,612 | 8/1959 | Dwork et al. | 307/232X |
| 2,907,932 | 10/1959 | Patchell | 307/232X |
| 3,153,754 | 10/1964 | McDonald | 318/(20.835) |
| 3,193,747 | 7/1965 | Kittrell | 307/232X |
| 3,375,771 | 4/1968 | Balcom, Jr. | 318/(20.835X) |
| 3,424,959 | 1/1969 | Gruner | 318/(20.835X) |
| 3,431,475 | 3/1969 | Wesner | 318/(20.835X) |
| 3,434,075 | 3/1969 | Hawkins | 329/50X |

*Primary Examiner*—T. E. Lynch
*Attorney*—Norman N. Holland

ABSTRACT: A phase discriminating control apparatus which will provide one of two alternating current outputs depending upon which of two alternating current inputs to the apparatus is leading. Each of the two inputs is coupled to one of two coupled firing circuits where the phase relationship between the input signals is determined. Each of the firing circuits is coupled to a bidirectional silicon thyristor and each of the thyristors is coupled to an alternating current source. The leading input signal to the apparatus results in one firing circuit gating one of the thyristors "on" while the other firing circuit gates the other thyristor "off." The thyristor gated "on" supplies an alternating current to the output. If the input signals change their phase relationship so that the leading signal is the former lagging signal, then the operation of the circuit causes the output voltage to appear at the thyristor which was formerly "off" and the remaining output thyristor will be turned off.

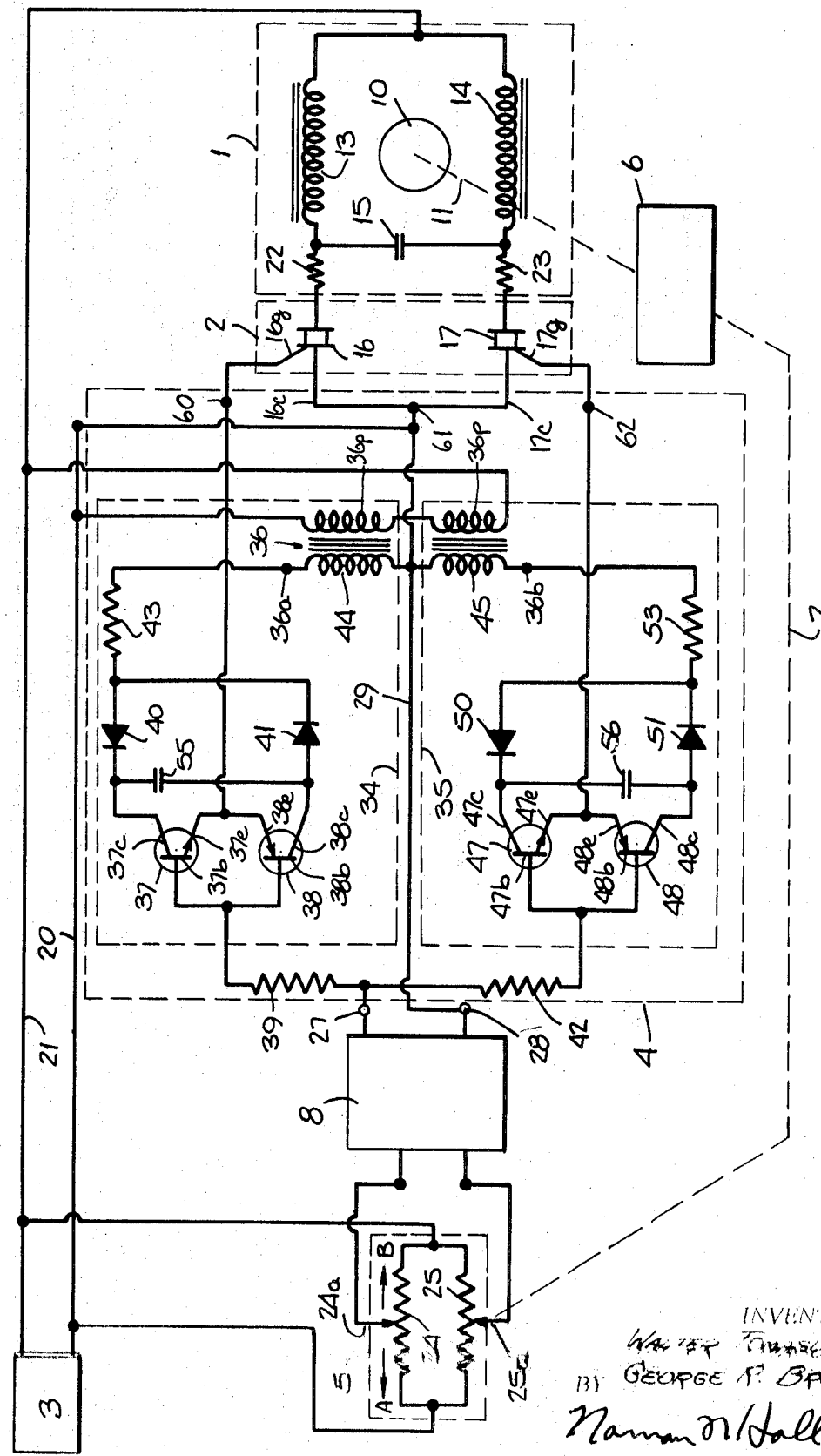

3,571,688

PHASE DISCRIMINATING CONTROL APPARATUS FOR A BIDIRECTIONAL SOLID-STATE AC POSITION SERVOMOTOR CONTROL

BACKGROUND OF THE INVENTION

This invention pertains to control apparatus producing two output signals depending on the phase relation of two input signals. In previous types of phase control apparatuses a large number have required a large number of components such as relays or solid-state devices to produce the desired phase comparison of the inputs for creating output signals representing different phase relations. As a result, these systems have been expensive and large.

SUMMARY OF THE INVENTION

A phase discriminating control apparatus receiving two input alternating signals of opposite phases and an input alternating current and comparing the signals with the current to produce output signals dependent on the phase relation of the input alternating signals and the input alternating current for creating an output signal on the occurrence of one phase relation and another output signal on the occurrence of another phase relation.

An object of the invention is to provide a solid-state phase discriminating control apparatus for comparing alternating input signals with an alternating current to produce output signals representing the phase relations of the input signals to the alternating current.

Another object of the invention is to provide solid-state phase discriminating control apparatus that receives alternating control signals from various types of control components for comparison with an alternating current to produce output signals dependent on the phase relation of the control signals and the alternating current.

Another object of the invention is to provide a solid-state phase discriminating control apparatus for distinguishing between phase related difference signals to operate an actuating means.

Another object of the invention is to provide a solid-state phase discriminating control apparatus for distinguishing between phase related difference signals to operate an electromechanical actuating means in two directions.

Another object of the invention is to provide a servosystem utilizing solid-state components to pass the load current and to control the passage of current by phase discrimination between difference signals.

Other and further objects of the invention will be obvious on an understanding of the illustrative embodiment about to be described, or will be indicated in the appended claims, and various advantages not referred to herein will occur to one skilled in the art upon employment of the invention in practice.

BRIEF DESCRIPTION OF THE DRAWING

A preferred embodiment of the invention controlling an electric motor has been chosen for the purpose of illustration and description and is schematically shown in the accompanying drawing, forming a part of the specification.

DETAILED DESCRIPTION

An electromechanical actuating means 1 is operable in two directions by solid-state control means 2 selectively passing current from an alternating current supply 3 on energization by phase discriminating control circuit 4 connected to control circuit 5. The control circuit 5 provides an alternating difference signal. The difference signal is phase related to the alternating supply current 3 to create signals selecting the directions of movement of the actuating means 1. The control circuit 5 is reset by the actuating means 1 through the coupling means 7 when the driven device 6 reaches the desired setting.

In this embodiment the electromechanical actuating means 1 is an electric motor 10 operating the driven device 6 and coupling means 7 by shaft 11 to precisely control the position of the device 6 and contact 25a. The motor has parallel field windings 13 and 14 and a capacitor 15 connected between the windings 13 and 14 to shift the phase of the currents passing through the windings 13 and 14 so that the motor is driven in opposite directions depending upon which winding is energized directly while the other winding is energized through the capacitor 15. The current through the windings 13 and 14 and capacitor 15 is controlled by the bidirectional silicon thyristors 16 and 17 of the solid-state control means 2. The bidirectional silicon thyristors are separately connected in series with the windings 13 and 14, respectively, across the alternating current supply 3 by the lines 20 and 21.

On conduction of bidirectional silicon thyristor 16 currents pass through winding 13 and the bidirectional silicon thyristor 16 and through winding 14 and capacitor 15 and the bidirectional silicon thyristor 16 to rotate the motor in a clockwise direction, since the currents through the two windings 13 and 14 are out of phase. On conduction of the bidirectional silicon thyristor 17 the current passes through the winding 14 and the bidirectional silicon thyristor 17 and through the winding 13 and capacitor 15 and bidirectional silicon thyristor 17 to rotate the motor in a counterclockwise direction.

Resistors 22 and 23 are connected in series with the bidirectional silicon thyristors 16 and 17, respectively, to limit the instantaneous current flow through the bidirectional silicon thyristors since the bidirectional silicon thyristors respond to the inductive impedance of the motor as a load on the bidirectional silicon thyristors. The bidirectional silicon thyristors are solid-state controlled devices which conduct current in both directions as long as a gate signal and a voltage is applied to the bidirectional silicon thyristor regardless of polarity. The conductivity of the bidirectional silicon thyristors 16 and 17 is controlled by the relationship of the potentiometers 24 and 25 of the control circuit 5. The potentiometers 24 and 25 are connected in parallel across the lines 20 and 21 to form a bridge circuit. The contact 25a of potentiometer 25 is driven by the shaft 11 of the motor 10 through the coupling means 7. The contact 24a of the potentiometer 24 is manually or remotely adjusted for repositioning of the apparatus or device 6. The movement of the contact 24a in either direction A or B from null position produces a difference signal. The difference signal is applied either directly to the input terminals 27, 28 of the phase discriminating control circuit 4 or through an amplifier 8, if desired. The amplifier 8 is an integrated circuit with an adjustable voltage gain of from 0 to 200 and amplifies the difference signal between the positions of the contacts 24a, 25a.

The phase discriminating control circuit 4 comprises firing circuits 34 and 35 and transformer 36. The two firing circuits are identical. The firing circuit 34 comprises the NPN transistor 37 and the PNP transistor 38 having their bases 37b, 38b connected through resistor 39 to the terminal 27. The collectors 37c and 38c are connected respectively through the diodes 40 and 41 and firing current limiting resistor 43 and the secondary winding 44 of the transformer 36 to the common line 29. The emitters 37e and 38e are connected to the gate 16g of the bidirectional silicon thyristor 16 to form alternate current paths. One current path is from the cathode 16c through the winding 44, resistor 43, diode 41, collector 38c, emitter 38e to the gate 16g. The other path has a reverse flow from the gate 16g through the emitter 37e, collector 37c, diode 40, resistor 43 and the winding 44 to the cathode 16c.

The firing circuit 35 comprises the NPN transistor 47 and the PNP transistor 48 having their bases 47b, 48b connected through resistor 42 to the terminal 27. The collectors 47c, 48c are connected through diodes 50 and 51, respectively, firing current limiting resistor 53, secondary winding 45 of the transformer 36 to the common line 29. The emitters 47e and 48e are connected to the gate 17g of the bidirectional silicon thyristor 17 to form alternate current paths. One current path is from the cathode 17c through winding 45, resistor 53, diode 51, collector 48c, emitter 48e to the gate 17g. The other path has a reverse flow from the gate 17g through the emitter 47e, collector 47c, diode 50, resistor 53 and the winding 45 to the cathode 17c. The collectors and emitters are the elements carrying the main firing current. The alternating supply voltage form lines 20, 21 is applied to the terminals 36a, 36b, through the transformer 36. The capacitors 55, 56 prevent erratic triggering by transient voltage spikes generated during switching.

Each transistor is subject to three polarity conditions. If the collectors of transistors 37 and 47 are negative with respect to their respective emitters the transistors conduct as forward biased diodes irrespective of the polarity of the base. If the emitters of the transistors 38 and 48 are negative with respect to their respective collectors, these transistors will function as forward biased diodes irrespective of the polarity of the base. If the emitters of the transistors 38 and 48 are negative with respect to their respective collectors, these transistors will function as forward biased diodes irrespective of the polarity of their respective bases. The diodes 40,41 50,51 are in series with the transistors 37,38 47,48 to block current flow under these forward biased conditions. The transistors 37 and 47 are conductive when the collectors are positive with respect to the emitters and a positive polarity is applied to a respective base. The transistors 38 and 48 are conductive when the collectors are negative with respect to the emitters and a negative polarity is applied to a respective base. If the polarity to the bases are reversed, these transistors are in a cutoff condition. In view of the arrangement of the transistors and diodes, direct current output control signals appear across the terminals 60,61 and 61,62. One or the other of the output control signals appear across the terminal 60,61 or 61,62 depending upon the phase relation of the input control signal applied to terminals 27,28 and the alternating supply voltage applied through the transformer 36. In this embodiment, the control signals are utilized as firing currents for the bidirectional silicon thyristors 16 and 17 controlling the direction of rotation of the motor. However, the signals may be utilized to control or operate any responsive device.

An alternating difference signal is applied to the control circuit 4 on a difference voltage occurring between the contacts 24a and 25a. This difference voltage is produced by the movement of contact 24a in either direction A or B from a null position. The polarity of the difference voltage applied to the terminals 27,28 reverses in timed relation with the polarity of the voltage across the terminals 36a, 36b of the secondary winding of the transformer 36.

Three signal conditions may occur across the input terminals 27,28 to the control circuit 4. The voltage across the terminals may be zero, corresponding to a null condition between the contacts 24a and 25a. The terminals 27,28 may be positive and negative, respectively, or negative and positive, respectively. The alternating supply current is applied to the potentiometers 24 and 25 and to the transformer 36. The phasing of the polarity of the difference signal to the polarity of the supply voltage creates four signal and supply voltage relations which the phase discriminating control circuit 4 discriminates between for the firing of the bidirectional silicon thyristors 16 and 17. Chart I illustrates polarity of the voltages applied to the firing circuits and the conductive condition of the transistors.

CHART I

| | Base polarity | Transistor condition | Collector polarity | Base polarity | Transistor condition | Collector polarity |
|---|---|---|---|---|---|---|
| Null, transistor: | | | | | | |
| 37 | 0 | Cutoff | + | 0 | Blocked | − |
| 38 | 0 | Blocked | + | 0 | Cutoff | − |
| 47 | 0 | do | − | 0 | do | + |
| 48 | 0 | Cutoff | − | 0 | Blocked | + |
| Control by circuit 34, transistor: | | | | | | |
| 37 | + | CONDUCTS | + | − | do | − |
| 38 | + | Blocked | + | − | CONDUCTS | − |
| 47 | + | do | − | − | Cutoff | + |
| 48 | + | Cutoff | − | − | Blocked | + |
| Control by circuit 35, transistor: | | | | | | |
| 37 | − | do | + | + | do | − |
| 38 | − | Blocked | + | + | Cutoff | − |
| 47 | − | do | − | + | CONDUCTS | + |
| 48 | − | CONDUCTS | − | + | Blocked | + |

NULL

Under null conditions a zero difference signal is applied to the bases 37b and 38b of the transistors 37 and 38. With the terminal 36a on the secondary winding positive, the transistor 37 is biased to cutoff and the transistor 38 is in condition to conduct irrespective of the bias voltage. The passage of current through the transistor is blocked by the diode 41 so that no current passes through either transistor and no firing signal is applied to the bidirectional silicon thyristor 16.

On the other firing circuit 35 with the terminal 36b negative the transistor 47 is in condition to conduct irrespective of the bias. The passage of current is blocked by diode 50 and no current flows through transistor 47. Transistor 48 is at cutoff. Thus no firing signal is applied to the bidirectional silicon thyristor 17. No field current flows to drive the motor 10 in either direction.

On reversal of the polarity the terminals 36a, 36b also reverse in polarity and the terminal 36a is negative. The transistor 37 is in condition to conduct irrespective of the bias. Current flow is blocked by the diode 43. Transistor 38 is biased to cutoff. On the other firing circuit the polarity of the terminal 36b is positive and transistor 47 is biased to cutoff and transistor 48 is prevented from conducting by the diode 51. Thus there is no firing signal under either polarity of the terminals 36a, 36b and the bidirectional silicon thyristors 16 and 17 remain nonconductive and no current flows to drive the motor 10 in either direction.

CONTROL BY CIRCUIT 34

On movement in direction A a positive signal is applied to the terminal 27. A positive voltage appears on the terminal 36a of the secondary winding. The transistor 37 conducts and current flows through the transistor 37, diode 40, resistor 43, winding 44, cathode 16c, gate 16g back to the transistor 37. The positive voltage on the collector 38c renders the transistor 38 conductive irrespective of the cutoff condition. Passage of current is blocked by diode 41.

In the firing circuit 35 the positive difference signal on terminal 27 and the negative voltage on terminal 36b drive the transistor 47 to conductive condition. The diode 50 blocks the flow of current. The positive difference signal drives the transistor 48 further to cutoff. Thus when a positive signal is applied to the terminal 27 only transistor 37 of the two firing circuits conducts.

On reversal of the polarity of the difference signal and alternating voltage the terminal 27 is negative and the terminal 36a is negative. The transistor 38 conducts since the collector 38c and base 38b are negative with respect to the emitter. The current flows through the transistor 38, diode 41, resistor 43, winding 41, cathode 16c, gate 16g back to transistor 38. The negative voltage on the collector 37c forwardly biases the transistor 37 and passage of current is blocked by the diode 40. In circuit 35 the transistor 47 is driven further to cutoff by the negative signal. The transistor 48 is forwardly biased by the positive voltage on the collector and current is blocked by the diode 71. Thus the circuit 34 provides the control signal at terminal 60,61 and the circuit 35 does not provide any control at the terminal 61,62

CONTROL BY CIRCUIT 35

On the movement of the contact 24a in direction B from a null condition the phase relation of the polarity of the difference signal and the alternating supply voltage as applied to the firing circuit terminals 36a, 36b changes. This causes the firing circuit 35 to render bidirectional silicon thyristor 17 conductive to rotate the motor in a counterclockwise direction. With a negative difference signal on terminal 27 and a positive voltage on terminal 36a and a negative voltage on terminal 36b the transistors 37, 38 and 47 cannot pass current and transistor 48 conducts. The transistor 37 is driven further into cutoff by the negative signal and current flow through the transistor 38 is blocked by the diode 41. The conductive transistor 47 is similarly blocked by the diode 50. The negative signal on the transistor 48 with a negative collector voltage renders this transistor conductive to fire the bidirectional silicon thyristor 17.

On reversal of the polarity of the difference signal the terminal 27 is positive, the polarity of the terminals 36a and 36b reverses so that terminal 36a is negative and 36b is positive. The conductive transistor 37 is prevented from passing current by the diode 40 and the transistor 38 is driven further into cutoff. The conductive transistor 48 is blocked by the diode 51 while the transistor 47 is rendered conductive by the positive signal on the base and positive voltage on the collector.

It is thus seen from the foregoing description a phase discriminating control circuit is set forth that provides two direct current output control signals which are proportional in magnitude to the value of the alternating input control signal with one output control signal corresponding to an in phase relation of the alternating input control signal with the alternating supply voltage and with the other output control signal corresponding to a phase opposition relation of the alternating input control signal and the alternating supply voltage. The phase discriminating control circuit has two circuits to produce the respective output control signals corresponding to the in phase and phase opposition relations. The input control signals may be supplied by any type of control device and the output control signals may be applied to any type of signal controllable device. In the foregoing specific embodiment the phase discriminating control circuit is utilized to operate the electric motor 10 by means of the control circuit 5. The input control signals could be derived from a pressure transducer, and the output control signals could operate solenoid valves to maintain given pressures. Another system may be a thermistor as the control circuit and power is applied to heaters under the control of the output signals. The output signals could control heating and cooling devices to maintain given temperatures. In another specific application of the phase discriminating control circuit the input control circuit may be a photosensitive device maintaining a constant level of intensity of illumination of lamps powered through the bidirectional silicon thyristors 16 and 17. These are only illustrative of the many different systems in which the phase discriminating control apparatus may be used.

Various modifications and changes may be made in the invention without departing from the invention as set forth in the following claims.

We claim:

1. A phase discriminating control apparatus for a position servomechanism, said discriminator responsive to first and second alternating current (AC) inputs which are 180 electrical degrees (180°) out of phase, comprising:
   a. a Wheatstone bridge operatively coupled to said first and second AC inputs and having a selectable output which can be either in phase with said first AC input or said second AC input;
   b. two firing circuits responsive to said Wheatstone bridge output and consisting of a first firing circuit comprising complementary transistors which provide an output signal for a Wheatstone bridge output in phase with said first AC input and a second firing circuit comprising complementary transistors which provide an output signal for a Wheatstone bridge output in phase with said second AC input; and
   c. two bidirectional silicon thyristors responsive to said firing circuits and coupled to said first and second AC inputs whereby said first firing circuit output energizes a first thyristor to provide an output proportional to said first AC input and second firing circuit output energizes a second thyristor to provide an output proportional to said second AC input.